US007568570B2

(12) United States Patent
Stripling et al.

(10) Patent No.: US 7,568,570 B2
(45) Date of Patent: Aug. 4, 2009

(54) SAFETY MONITORING SYSTEM FOR A PEOPLE CONVEYOR

(75) Inventors: Ralph Stripling, Berlin (DE); Dietmar Thaler, Seggebruch (DE); Frank M. Sansevero, Glastonbury, CT (US); Bernward Engelke, Hildesheim (DE); Andreas Stuffel, Bückeburg (DE); Peter von Riegen, Haste (DE); Markus Müller, Berlin (DE); Olaf Märker, Niedernwöhren (DE); Carsten Deseniss, Suthfeld (DE); Ingo Engelhard, Berlin (DE); Uwe Hauer, Nienburg (DE)

(73) Assignee: Otis Elevator Company, Farmington, CT (US)

( * ) Notice: Subject to any disclaimer, the term of this patent is extended or adjusted under 35 U.S.C. 154(b) by 759 days.

(21) Appl. No.: 10/527,729

(22) PCT Filed: Sep. 13, 2002

(86) PCT No.: PCT/EP02/10316

§ 371 (c)(1), (2), (4) Date: Mar. 14, 2005

(87) PCT Pub. No.: WO2004/033355

PCT Pub. Date: Apr. 22, 2004

(65) Prior Publication Data

US 2006/0006045 A1 Jan. 12, 2006

(51) Int. Cl.
*B66B 25/00* (2006.01)
*B66B 21/00* (2006.01)
*B65G 43/00* (2006.01)

(52) U.S. Cl. ....................... 198/323; 198/322; 198/325; 198/327

(58) Field of Classification Search ................. 198/322, 198/323, 326, 327, 325
See application file for complete search history.

(56) References Cited

U.S. PATENT DOCUMENTS 4,470,497 A 9/1984 Kraft (Continued)

FOREIGN PATENT DOCUMENTS

DE 10027490 C2 12/2001

(Continued)

OTHER PUBLICATIONS

PCT International Search Report for PCT/EP02/10316, dated May 16, 2003.

(Continued)

*Primary Examiner*—Gene Crawford
*Assistant Examiner*—Leslie A Nicholson, III
(74) *Attorney, Agent, or Firm*—Carlson, Gaskey & Olds PC

(57) ABSTRACT

People mover (2) comprising an endless tread belt (6) formed from several tread elements (4) connected to one another, which is driven by a drive unit about a first and second reversal point (22), and a side skirt (24) moved along with tread belt (6), the side skirt (24) comprising flange elements (28) joined to the tread element (4) and bridge elements (30) connected movably relative to flange elements (28). A sensor (38) is arranged adjacent to the side skirt (24), the sensor (38) having a limited detection range perpendicular to the circulation direction of side skirt (24), and a plurality of marking elements are arranged in a line on side skirt (24) along the circulating direction having a limited width perpendicular to the circulating direction.

10 Claims, 2 Drawing Sheets

U.S. PATENT DOCUMENTS

Figure 1:
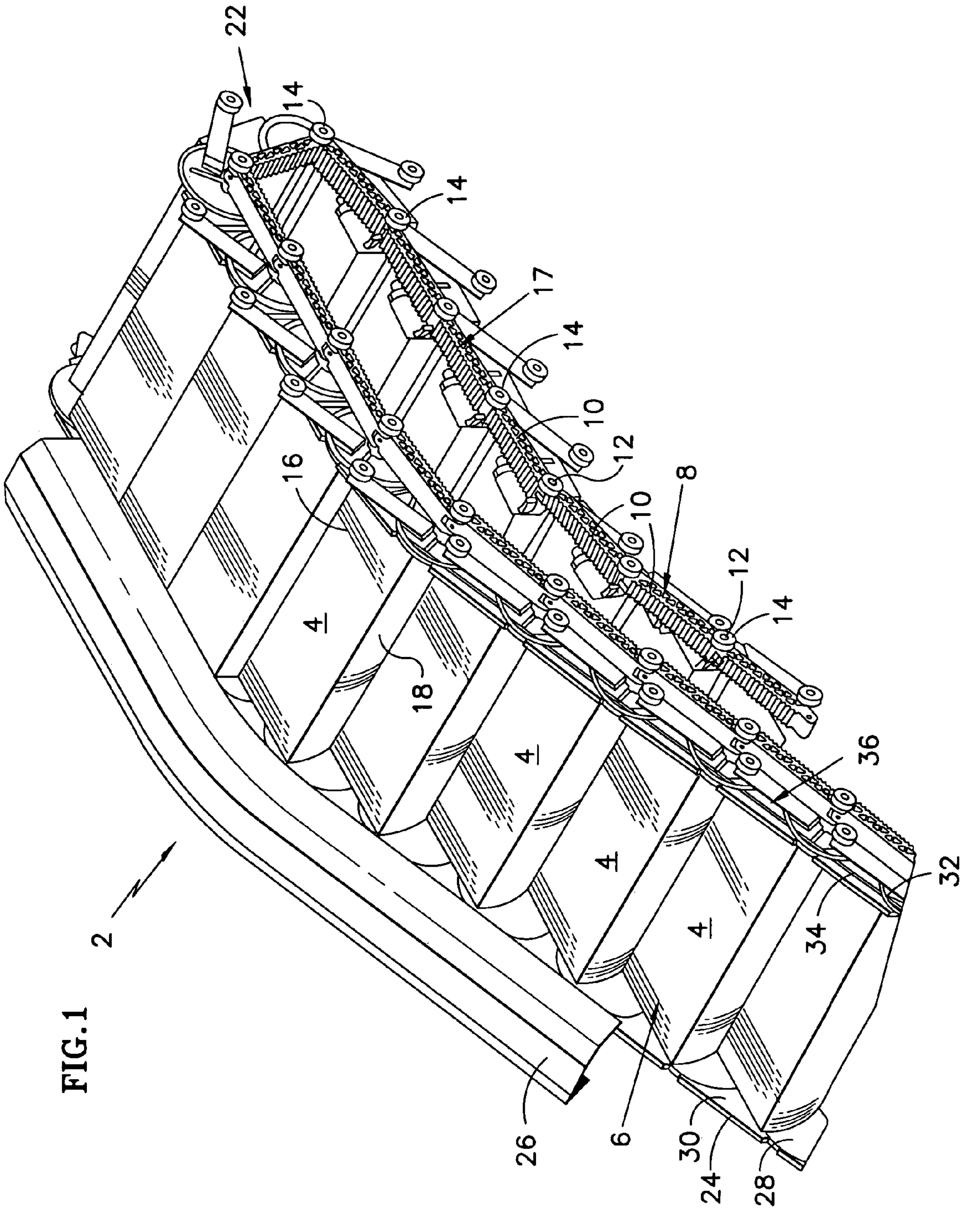

| | | | | |
|---|---|---|---|---|
| 4,863,006 | A * | 9/1989 | Kotkata et al. | 198/323 |
| 5,622,246 | A * | 4/1997 | Kubota | 198/321 |
| 6,079,698 | A * | 6/2000 | Patterson et al. | 267/33 |
| 6,267,219 | B1 * | 7/2001 | Spannhake et al. | 198/323 |
| 6,450,316 | B1 | 9/2002 | Stuffel et al. | |
| 6,601,688 | B1 * | 8/2003 | Stoxen | 198/323 |
| 6,868,956 | B2 * | 3/2005 | Hauer et al. | 198/333 |
| 2003/0168311 | A1 | 9/2003 | Balzer-Apke et al. | |

FOREIGN PATENT DOCUMENTS

| | | | |
|---|---|---|---|
| DE | 10156991 | A1 | 6/2002 |
| DE | 10156992 | A1 | 6/2002 |
| EP | 0 599 452 | A1 | 6/1994 |
| JP | 2001002358 | | 1/2001 |

OTHER PUBLICATIONS

PCT International Preliminary Examination Report for PCT/EP02/10316, dated Jun. 9, 2004.

* cited by examiner

SAFETY MONITORING SYSTEM FOR A PEOPLE CONVEYOR

The invention pertains to people movers comprising an endless tread belt formed from several tread elements connected to one another, which is driven by a drive unit about a first and second reversal point, and a side skirt moved along with the tread belt, the side skirt comprising flange elements joined to the tread belt and bridge elements connected movably relative to the flange elements.

Such people movers are known from, for instance, DE 101 56 991 A1 and DE 101 56 992 A1. Moving walkways and escalators are typical representatives of people movers with a circulating endless tread belt. Thus an escalator typically comprises a plurality of mutually connected step bodies, which together form the tread belt. They are driven by a drive motor about an upper and a lower reversal point, for instance, in the form of a reversing sprocket wheel, reversing guide track or a reversing shield, etc. In a similar manner, moving walkways can comprise several palette bodies joined to one another, likewise driven circulating around two reversal points. For moving walkways, the tread belt is usually called a pallet belt, while it is usually called a step belt for escalators. The tread elements for both are typically connected at their sides to conveying chains, which typically also transfer the drive force of the tread belt. Thus, for instance, one of the reversing chain wheels can simultaneously be constructed as a drive wheel. Alternatively, other drive units, such as linear motor drives can be connected in the moving forward zone or the return zone of the conveying chains. In principle, it is also possible to provide drive units that act directly on the individual tread elements and for which the chain represents primarily only the connection between the individual tread elements.

As a matter of principle, great attention is given to the safety of passengers for such people movers. In the previously described type of people mover with a concurrently moving side skirt, the risk existing for a fixed skirt that parts of clothing or limbs of passengers might be drawn in between the moving tread belt and the stationarily mounted skirt is avoided or considerably reduced. The moving side skirt typically runs at the top in a fixed trim piece or in the balustrade. Moreover, the movable side skirt typically consists of several parts, some of which are stationarily arranged laterally on the tread elements in the form of lateral flange elements, or are movably arranged between these flange elements in the form of bridge elements and are placed, for example, on the step chain in order to reliably close an otherwise open space between the flange elements. Slideways are typically provided between the flange elements and the bridge elements. In particular, the flange elements and the bridge elements can run relative to one another in a tongue and groove arrangement. For installation, the bridge elements can be removed relatively easily. Of course there is a certain risk that the bridge elements may be broken away due to vandalism. In such a case, a "hole" circulates along with the movable side skirt, which is highly dangerous. If, for example, a body part is in such a hole in the area where the tread belt enters the floor, then the edge of the subsequent flange element acts as a crush edge and severs this body part. For this reason, it is absolutely required that the escalator be deactivated immediately whenever such a bridge element is missing from the movable side skirt.

An escalator with movable side skirt, wherein the side skirt is formed from side skirt elements movably connected to the escalator steps is known from U.S. Pat. No. 4,470,497. A sensor that can detect the absence of side skirt elements is additionally provided.

For people movers with tread elements, there are also typically various types of sensors, for instance, for detecting completely missing tread elements, or sensors that can detect a shift of the tread elements out of the correct position. Thus, for instance, in case the plastic running surface provided on the step shaft rollers is lost, there may be a subsidence of the step downwards, or a rising of the step above its ordinary position in other parts of the turnaround area. For these purposes a plurality of sensors are provided, each being able to detect one typical actual error. Thus, the sensors for detecting missing tread elements are typically located in the return strand of the people mover and bring about an interruption of the operation of the people mover as soon as a missing tread element is detected. Other sensors detect, for example, a shifting of the step shaft, in order to be able to detect a shifting of the step upwards or downwards.

The problem of the invention is to make available a simple and economical sensor means for detecting missing bridge elements and missing tread elements as well as for detecting that they are out of their correct position. According to the invention, this problem is solved in that, in the people mover as described above, a sensor is provided which is arranged adjacent to the concurrently moved side skirt, the sensor having a limited detection range perpendicular to the circulation direction of the side skirt, and with marking elements arranged in a line on the side skirt along the circulating direction being provided, the marking elements having a limited width perpendicular to the circulating direction.

With this type of sensor means, the monitoring of missing tread elements and missing bridge elements is integrated, with the absence of a flange element connected to a tread element serving as an indicator of the absence of the entire step. The flange elements are either formed in one piece with the tread elements or are permanently bolted to them, so that a situation in which a flange element is present but the actual tread element is missing is inconceivable The limited detection range of the sensor perpendicular to the circulation direction of the tread, in combination with the limited widths of the marking elements perpendicular to the circulation direction makes it possible to generate an alarm signal not only if a part of the side skirt or a step is completely absent, but also if there has been a shifting of this part beyond a certain amount. The detection range of the sensor and the width of the marking element are favorably selected such that a shifting of the step element, in particular, can occur only to the extent permissible according to regulations, and an error report takes place whenever this permissible amount is exceeded.

The sensor is preferably arranged at particularly critical points, for instance, just in front of the area where the belt enters the floor, in order to prevent a "hole" from entering the return area. Another preferred point is in the vicinity of the emergence area of the tread belt in order to prevent a belt in which a tread element is missing from moving into the forward motion area. Those areas in which there is a greater tendency for a shifting of the tread to occur are also relevant. Let it be explicitly pointed out that this type of sensor means can also be employed for people movers with moving side skirts that do not have flange elements mounted on the tread elements and bridge elements, but merely concurrently moved side skirt elements as provided, for example, in U.S. Pat. No. 4,470,497, already mentioned. One can imagine providing the marking elements alternately on the tread elements and the side skirt elements, so that a comprehensive error detection can be accomplished in that way as well.

Preferably, at least one sensor is provided on both sides of the tread belt to detect missing tread elements and missing bridge elements. The probability that a tread element is missing and at the same time that both flange elements of this tread element remain in the side skirt and are detected by the sensor approaches zero.

The concurrently moved side skirt consisting of flange elements and bridge elements has an exposed visible side facing the tread elements and an oppositely oriented side, which is not perceived by the user of the people mover. The sensor is preferably arranged on the side other than the visible side, in the "interior" of the people mover.

On each of the flange elements and/or the bridge elements of the concurrently moved side skirt, a rib is preferably provided, which serves for the detection of the flange element or bridge element by the sensor and is arranged on the side other than the visible side of the concurrently moved side skirt. The rib can either be detected directly by a sensor or, alternatively, the rib can contain or have marking elements that are detected by the sensor. The rib can also be constructed as a reinforcement element for the otherwise relatively thin material of the side skirt.

The ribs are preferably arranged such that, in the linear area of the people mover, they are arranged in series essentially along a straight line, with the sensor constructed such that it detects interruptions in the series of ribs or of marking elements. "Linear area" is understood as an area in the tread belt of the people mover in which the tread elements are arranged essentially along a straight line. For escalators, this is typically the conveyance area or the inclined area of the forward motion area of the people mover, in which the tread elements are exposed in order to convey the passengers, or a linear area in the return area of the people mover in which the tread elements are conveyed back. For escalators, there is a distinction between the following areas, starting with the lower landing in the outgoing area: lower landing, lower transitional area, inclined area, upper transition area, and upper landing, the direction of motion in the upper and lower landing being essentially horizontal. The situation for moving walkways is similar. The sensor is preferably arranged in such a linear area. It could also be arranged, however, in an area in which the series of ribs do not form a straight line, but rather an "angular" curve.

Preferably, a noncontact sensor is provided. A magnetic sensor is particularly preferred. Alternatively, however, contact sensors can also be provided which, for instance, run with the side skirt by means of a roller or a carriage and open or close a contact in case of the absence of a flange element or a bridge element. Alongside magnetic or inductive sensors, alternative noncontact sensors are, for example, capacitive sensors and optical sensors. Ultrasonic sensors can also be provided. It is particularly preferred if the sensors are constructed as proximity sensors, i.e., are able to detect the distance of the side skirt away from the sensors. An excessively large lateral movement of the side skirt, and thus of the entire tread belt, is an indicator of excessive play in the people mover, caused by wear or incorrect installation/adjustment. In both cases it is advisable to check the system. It is necessary in general to take the entire system out of operation immediately upon detecting a missing part, in order to avoid injury to people or damage to the system. It is also advisable to relay signals of the monitoring means via, for example, the system controller to a maintenance center which engages customer service in case of a shutdown of the system or takes similar steps in case a proximity sensor ascertains irregularities in the operation of the system that do not automatically lead to a shutdown of the system.

The flange elements and the bridge elements are preferably produced from aluminum material, and it is especially preferred that the ribs be constructed in one piece with them. It is additionally preferred that at least one clip made of spring steel be provided on the rib of each flange element and of each bridge element. Aluminum material can be produced relatively economically, particularly with the pressure-casting method. It is also a relatively lightweight material, which is particularly preferred for such systems. Moreover, the tread elements are often produced from pressure-cast aluminum, and it is especially preferred that the flange elements be produced in one piece with the tread elements. Pressure-cast aluminum material can in principle be detected by the magnetic sensors preferred by the applicant, and there are also inductive sensors for nonferrous materials. In such a case, the ribs are preferably not provided to be continuous, but are instead interrupted. The sensor detects the difference rib/no rib and generates a dynamic signal. Then, however, it is necessary to provide a sufficiently high rib. That is frequently not desired for reasons of space. Instead it can be more economical to provide, in or on the rib, a marking element that can be detected by the sensor. It is particularly simple for this to be a clip made of spring steel, which may have barbs, and can be pressed onto the rib relatively easily. For magnetic sensors, a clip made of magnetic spring steel is desirable.

The rib preferably extends over essentially the entire length of the flange element or the bridge element. The clips are preferably essentially half as long as the corresponding rib or flange element or bridge element in the extension direction of the marking element. In continuous operation of the people mover, this design of the length of the marking elements or this interrupted arrangement of the marking elements generates a dynamic signal which is essentially a square-wave signal that fluctuates between a zero value and a maximum value. A dynamic signal has the advantage over a static signal in that it is immediately recognizable whether the signal means is functional or not. An electronic analysis unit to analyze dynamic signals is preferably provided. This electronic analysis unit carries out a frequency analysis, for instance, on the above-described square-wave signal and can thus determine the absence of a single pulse and thus of a single flange element or bridge element and, in reaction thereto, put the system out of operation. The electronic analysis unit can be one that is typically used for such systems. Such electronic analysis units are available on the market, but they have only a relatively limited number of signal inputs. For embodiments in which the ribs themselves are the marking elements, corresponding interruptions in the series of ribs can also be provided.

Preferably, a sensor is provided on each side of the tread belt at essentially identical positions, the two sensors being connected in series and connected to one input of the electronic analysis unit. These are sensors that pass on an input signal whenever they detect the presence of a flange unit or a bridge unit; i.e., in case of successful detection by the first sensor, it passes the signal on to a second sensor. If the latter can also successfully detect a bridge element or a flange element in the corresponding time interval, which is defined by the length of the marking element, i.e., the clip or the rib, then this signal is passed on to the electronic analysis unit. This type of arrangement of the sensors requires a certain minimum length of the ribs or the marking elements so that there is a sufficiently long overlap of the signals from the sensors and has the advantage that only one input of the electronic analysis unit is occupied for two (or possibly more) sensors.

On each flange element or bridge element, at least two marking elements are preferably provided, for instance, one behind the other. Signals are then favorably analyzed such that two signals must be missing before the system is shut down. If only one signal is missing, then a maintenance request is relayed to, for example, the nearest maintenance center. The background for this is that it can certainly happen that, for instance, a contact gets lost or a signal is not detected. For the operator, such a measure reduces very undesirable, pointless shutoffs to a minimum with minimal additional expense.

Figure 2:
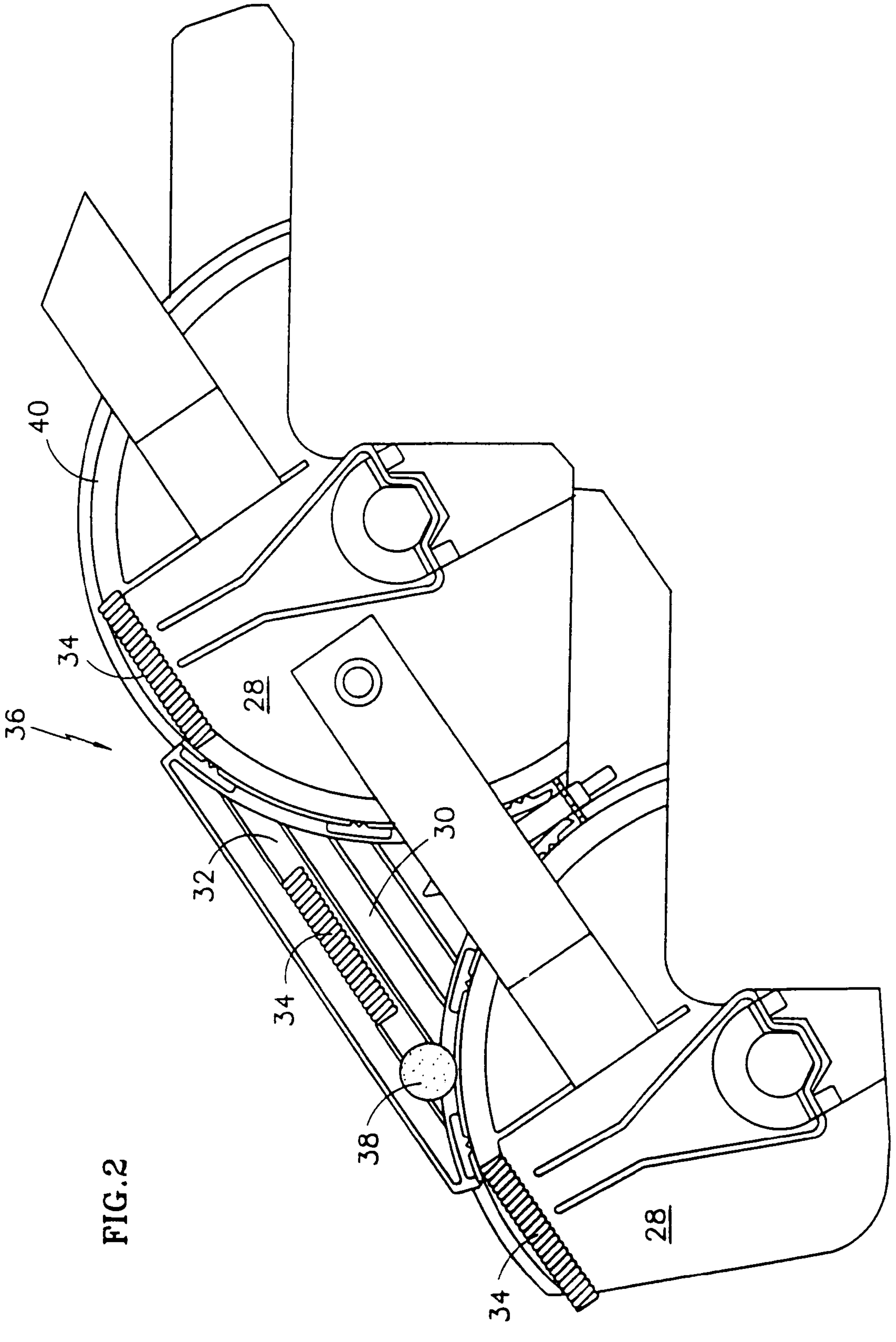

The invention and configurations of the invention will be described below on the basis of a graphically represented embodiment. Shown are:

FIG. 1, a part of a people mover according to the invention, in which parts have been broken away for a better representation; and FIG. 2, a detail view of an escalator according to the invention.

In FIG. 1, one can recognize a people mover in the form of an escalator 2, comprising an endless step belt 6 formed of several mutually connected tread steps 4. The tread steps 4 are each connected to conveyance chains 8 provided at the sides. Connected "at the sides" is intended to include both embodiments in which the conveyance or step chain[s] 8 are provided laterally alongside the tread steps 4 as seen in a plan view and those in which the step chains 8 are provided laterally underneath the tread surface 16 of a tread step 4 as seen in the plan view. The conveyance chains 8 are formed from a plurality of chain links 10. The chain links 10 are connected together at turning points 12. Also provided at these turning points 12 are step chain rollers 14, which guide the step chains 8 in step chain guides (not shown) along the closed circulation path.

Step chain 2 is powered by a linear drive (not shown), which is constructed in the manner of a linear drive formed by an endless revolving toothed drive belt. The toothing of the toothed drive belt engages with toothing 17 of chain links 10. The linear drive is preferably arranged in the constantly inclined area of escalator 2. As an alternative to the linear drive, it is also possible to provide conveyance chain 8 with a conventional drive unit in, for instance, upper or lower reversal point 22.

In FIG. 1, it is also recognizable that a tread element 4 has a tread surface or "tread step" 16 as well as a front surface or "riser" 18. One also recognizes that an area of constant inclination is present, in which riser 18 essentially always has the same height. One also recognizes a transition area, in which riser 18 has an increasingly smaller height, until it is finally no longer present just before a reversal point 22, i.e., the individual tread elements or tread steps 4 are arranged in one plane.

One also recognizes in FIG. 1 a concurrently moved side skirt 24, as well as balustrade trim 26, which covers concurrently moved side skirt 24 at the top and continues upwards from there. On top of trim 26, a balustrade made, for example, of glass can be placed, in which a handrest (not shown) circulates essentially synchronously with step belt 6.

Concurrently moved side skirt 24 comprises flange elements 28 having essentially a semicircular shape that are mounted on tread elements 4. Between each two flange elements 28 there is provided a bridge element 30 to fill out the space between them and to enable a movement of concurrently moved side skirt 24 from the constantly inclined area through the transition area into the landing area and from there via the reversal point to the return area. Flange elements 28 and bridge elements 30 can be constructed to engage with one another in a type of tongue and groove joint, thus permitting relative motion with respect to one another. In place of balustrade trim 26 overlapping concurrently moved side skirt 24, a trim piece that more or less directly adjoins concurrently moved side skirt 24 at the top can also be provided and can be engaged with concurrently moved side skirt 24 in similar manner by means of a tongue and groove joint.

Flange elements 28 are preferably formed integrally with tread elements 4, typically from an aluminum material, with manufacture from pressure-cast aluminum being particularly favored. Bridge elements 30 are also preferably formed from such a material. Ribs 32 and marking elements 34 in the form, for example, of spring steel clips 34 on flange elements 28 and bridge elements 30 are shown only very schematically in FIG. 1. It is recognizable that these ribs and markers are arranged essentially along a straight line in the constantly inclined area of people mover 2 and form a continuous series 36 of ribs there.

In the enlarged detail view of FIG. 2, rib series 36 comprising ribs 32 and spring steel clips 34 is more clearly recognizable. One can also recognize a schematically shown sensor 38, which is located between two spring clips 34 in the position shown. One recognizes in particular that rib 32 on flange elements 28 is a section of peripheral rib 40 of flange elements 28 that has been formed in a straight line. This is preferred for reasons of manufacturing technology.

Spring steel clips 34 preferably consist of a magnetic spring steel. It is also possible to glue essentially flat elements of magnetic material to, for example, the rib or the inner side of flange elements 28 or bridge elements 30. The attachment of clamping elements is particularly simple for reasons of operating and manufacturing technology, however, and is therefore preferred. For other than magnetic sensors 38, other suitable marking materials can be provided. The marking materials can also be provided in the ribs by, for instance, being cast in. Alternatively, the ribs themselves can be constructed such that they represent appropriate marking elements. Measuring quite roughly, the marking elements or spring steel clips have roughly half the length of the associated flange elements 28 or bridge elements 30 at the corresponding positions. Putting it in other terms, the signals generated by a sensor 38 are preferably, roughly square-wave signals with equal duration of the pauses and the individual signals. The marking elements should have a predetermined minimum length to guarantee assured detection and thus an assured signal. That is particularly the case if two sensors 38 are arranged at the same height on different sides of tread belt 6 in order to compensate for possible tolerances in the arrangement of the sensors and the marking elements.

Spring steel clips 34 are preferably formed in essentially a U shape, so that they can be fastened to rib 32 with the legs of the U gripping laterally across rib 32. Barbs are preferably provided to prevent detachment of spring steel clips 34 from rib 32.

The sensors 38 can be mounted, for example, on the framework (not shown) of people mover 2, on the balustrade, on the rail system, on the handrest drive unit or at other suitable positions. It is preferred to arrange at least one sensor pair on people mover 2 such that a missing flange element 28 or a missing bridge element 30 is discovered before the concurrently moved side skirt 24 at that point begins to move under balustrade trim 26 or in some other manner into the return area. Thus it is assured that, if a "hole" exists, people mover 2 is stopped before the hole begins to get smaller. Since people movers 2 of the type shown can generally be moved in two directions, i.e., from left to right in FIG. 1 and from right to left, a corresponding pair of sensors should be arranged at both ends of the linear area of the people mover 2. The two sensor pairs are conceived especially to detect vandalism damage to people mover 2 and, here in particular, bridge elements that have slipped out of place. It is additionally favorable to place at least one sensor, better yet, a pair of sensors, in, for instance, the center of the return area, so as to be able to detect, in particular, missing flanges 28 and the resulting missing tread elements 4. In the return area it would be more favorable to provide a pair of sensors at each reversal point 22 as in the forward motion area.

The sensors are connected to a suitable electronic analysis unit (not shown) that is connected to the control unit of system 2 and can shut down people mover 2.

The invention claimed is:

1. People mover (2) comprising:

an endless tread belt (6) formed from several tread elements (4) connected to one another, which is driven by a drive unit about a first and second reversal point (22);

a side skirt (24) moved concurrently with the tread belt (6), the side skirt (24) on the tread elements (4) comprising flange elements (28) joined to the tread belt and bridge elements (30) connected movably relative to the flange elements (28);

a sensor (38) which is arranged adjacent to the side skirt (24), the sensor (38) having a limited detection range perpendicular to a circulating direction of the side skirt (24); and a plurality of marking elements (34) arranged in a line on the flange elements (28) and the bridge elements (30) along the circulating direction and having a limited width perpendicular to the circulating direction.

2. People mover (2) according to claim 1, wherein, on each of the flange elements (28) and bridge elements (30) of the side skirt (24), a rib (32) is provided that serves the detection of flange element (28) or bridge element (30) by sensor (38) and that is arranged on a side of the side skirt (24) that is opposite from the visible side.

3. People mover (2) according to claim 2, wherein the ribs (32) are arranged in series essentially along a straight line in a linear area of people mover (2), the sensor (38) being constructed such that it detects interruption in the rib series (36).

4. People mover (2) according to claim 1, wherein the plurality of marking elements (34) is arranged in a noncontinuous line along the flange elements (28) and the bridge elements (30).

5. People mover (2) according to one of claims 1-3, wherein two of the sensors (38) are connected in series.

6. People mover (2) according to one of claims 1-3, wherein the plurality of marking elements (34) are clips and a clip (34) is provided for each flange element (28) or bridge element (30).

7. People mover (2) according to one of claims 1-3, wherein the sensor (38) is a noncontact sensor.

8. People mover (2) according to claim 7, wherein the sensor (38) is a magnetic sensor.

9. People mover (2) according to one of claims 2-3, the flange elements (28) and bridge elements (30) are manufactured from aluminum material and the ribs (32) are constructed in one piece therewith, and wherein the plurality of marking elements (34) are clips and at least one clip of spring steel is provided on the rib (32) of each flange element (28) and each bridge element (30).

10. People mover (2) according to claim 9, wherein the clips (34) are essentially half as long as the corresponding ribs (32).

* * * * *